March 30, 1965  J. W. DEMPSTER ET AL  3,175,718
APPARATUS FOR HANDLING CONTAINERS
Filed Feb. 1, 1963  7 Sheets-Sheet 1
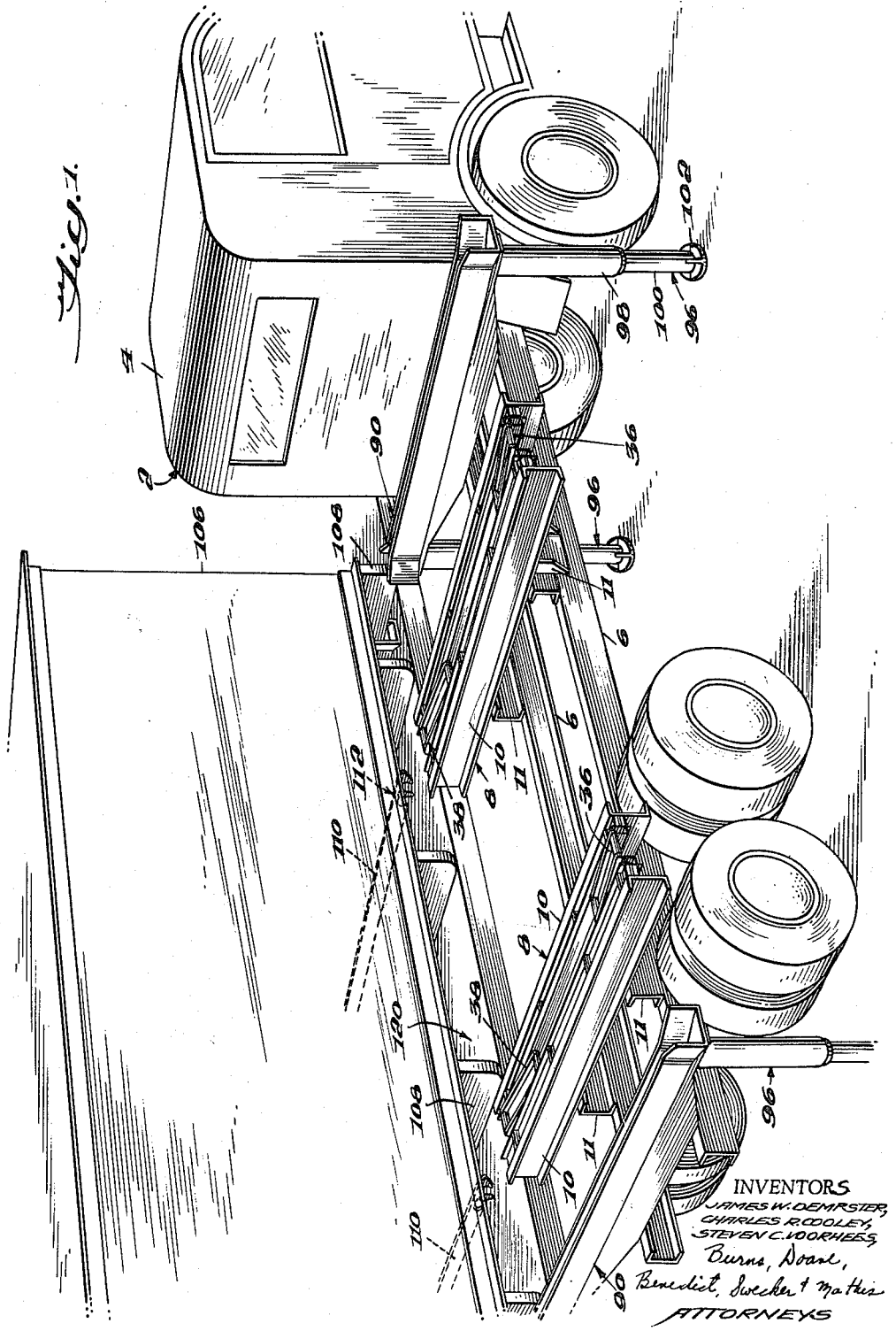
INVENTORS
JAMES W. DEMPSTER,
CHARLES R. COOLEY,
STEVEN C. VOORHEES
Burns, Doane,
Benedict, Swecker & Mathis
ATTORNEYS March 30, 1965 J. W. DEMPSTER ET AL 3,175,718
APPARATUS FOR HANDLING CONTAINERS
Filed Feb. 1, 1963 7 Sheets-Sheet 2
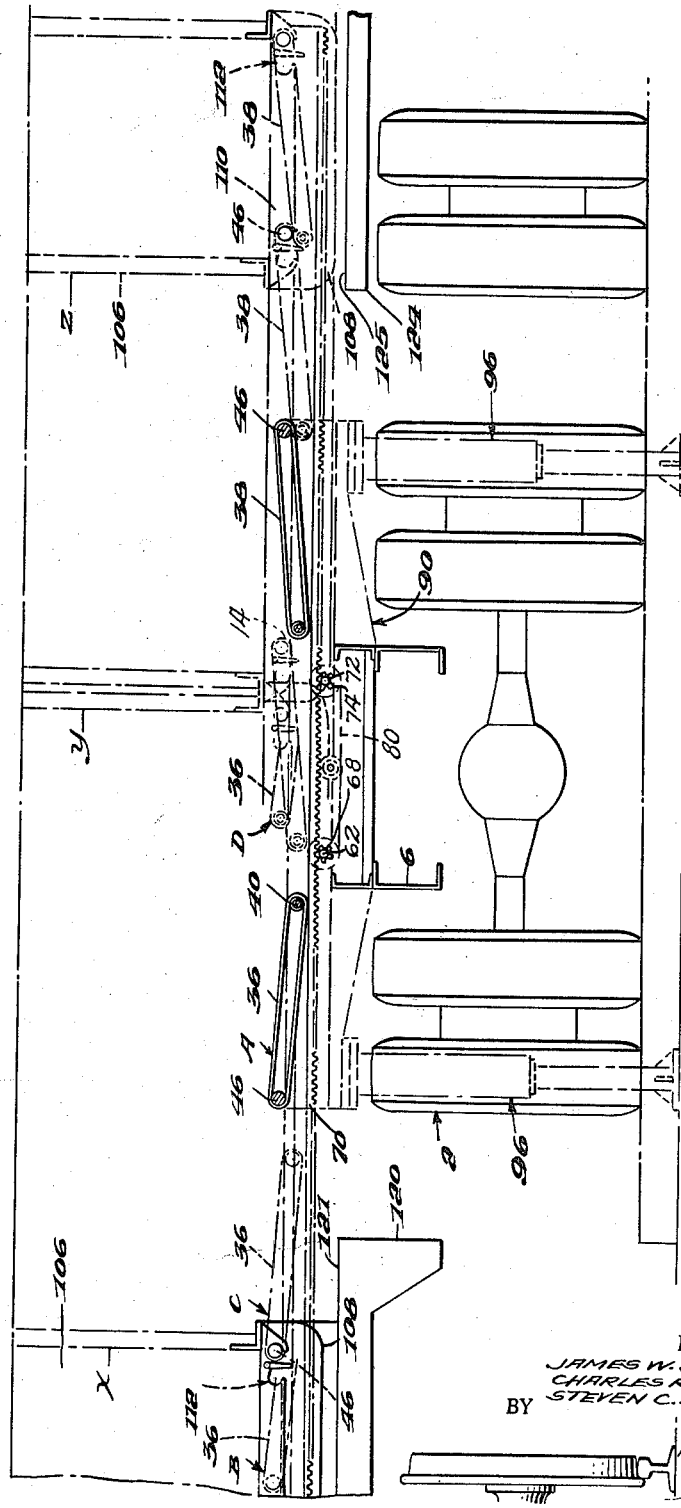
INVENTORS
JAMES W. DEMPSTER,
CHARLES R. COOLEY,
BY STEVEN C. VOORHEES,
Burns, Doane,
Benedict, Swecker
Mathis
ATTORNEYS

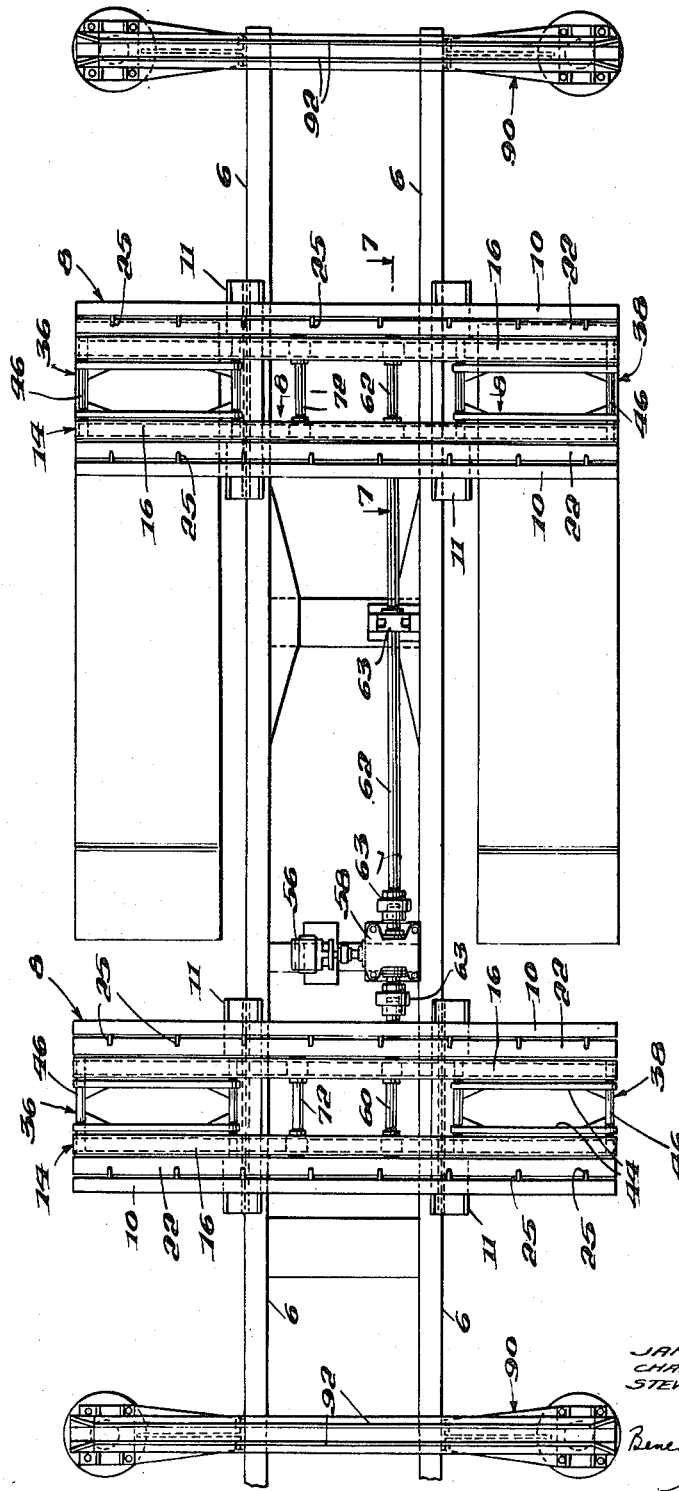

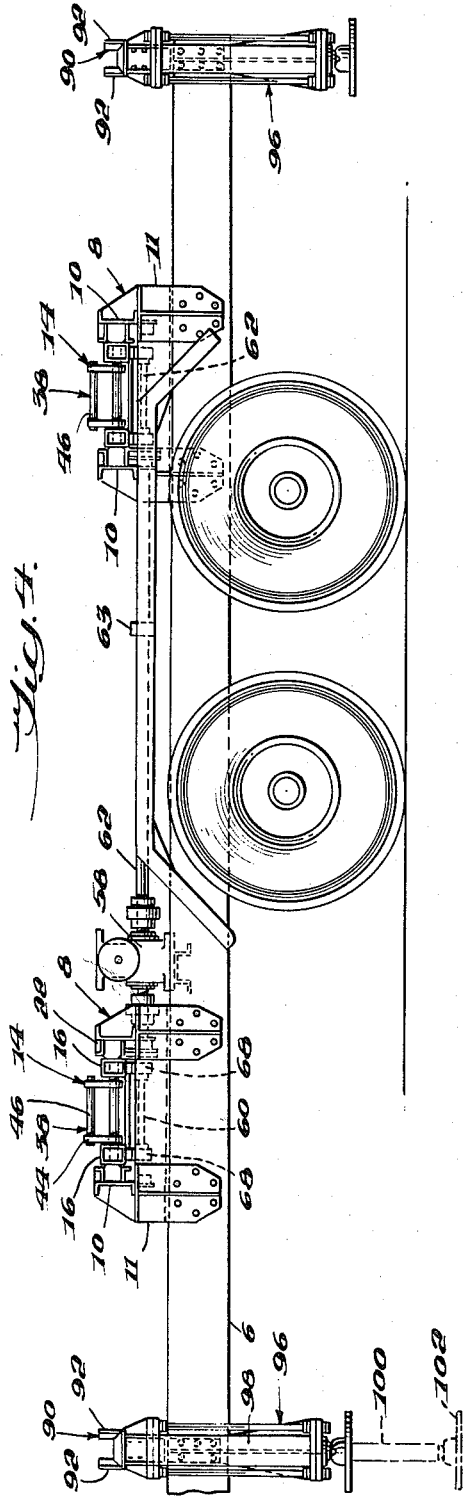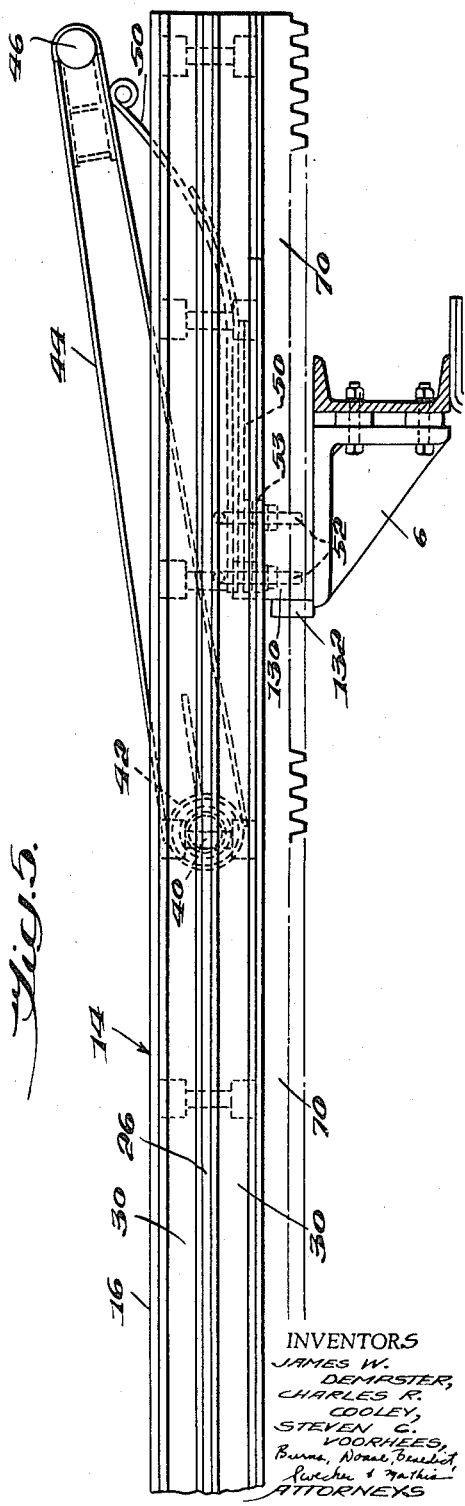

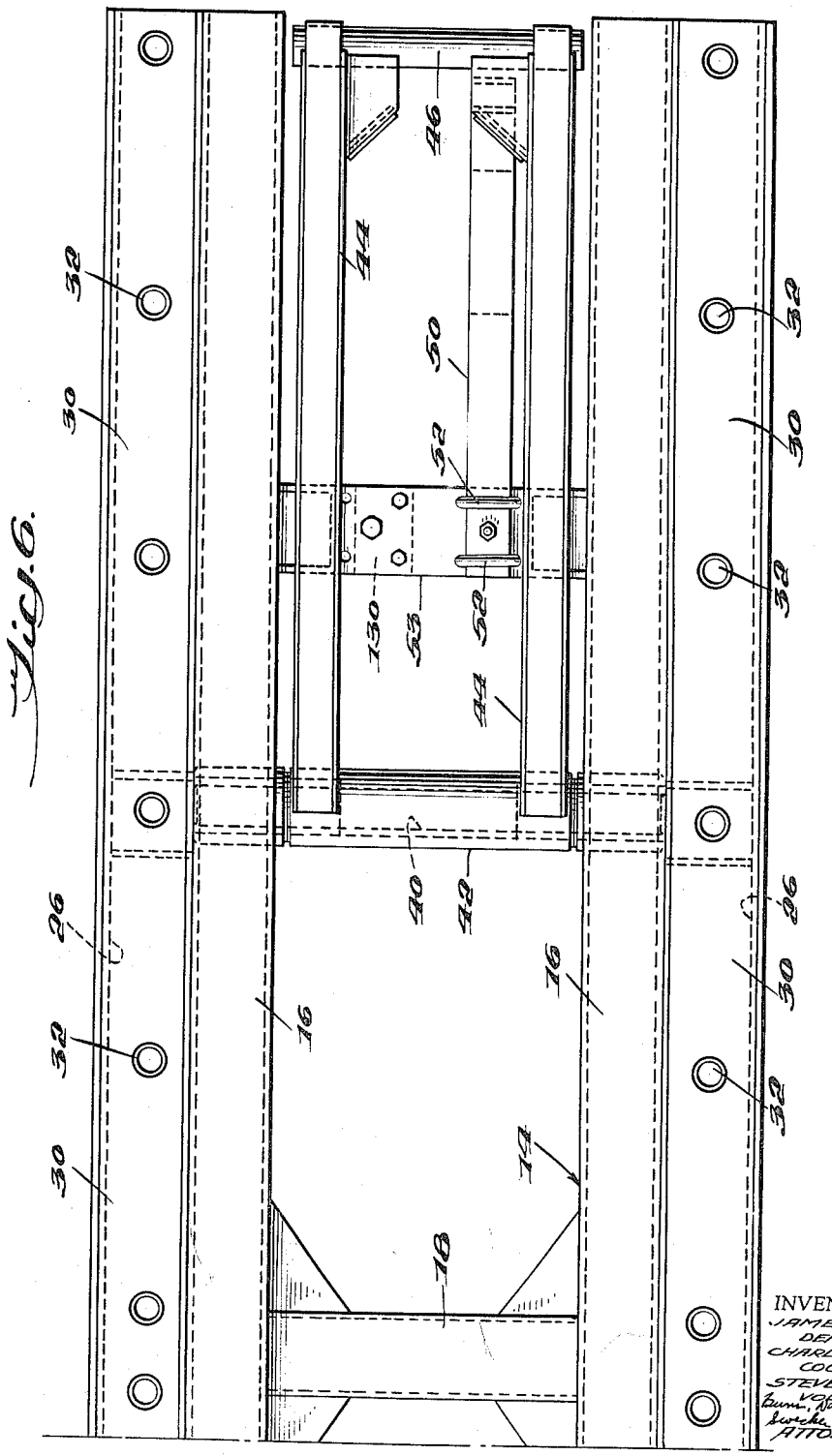

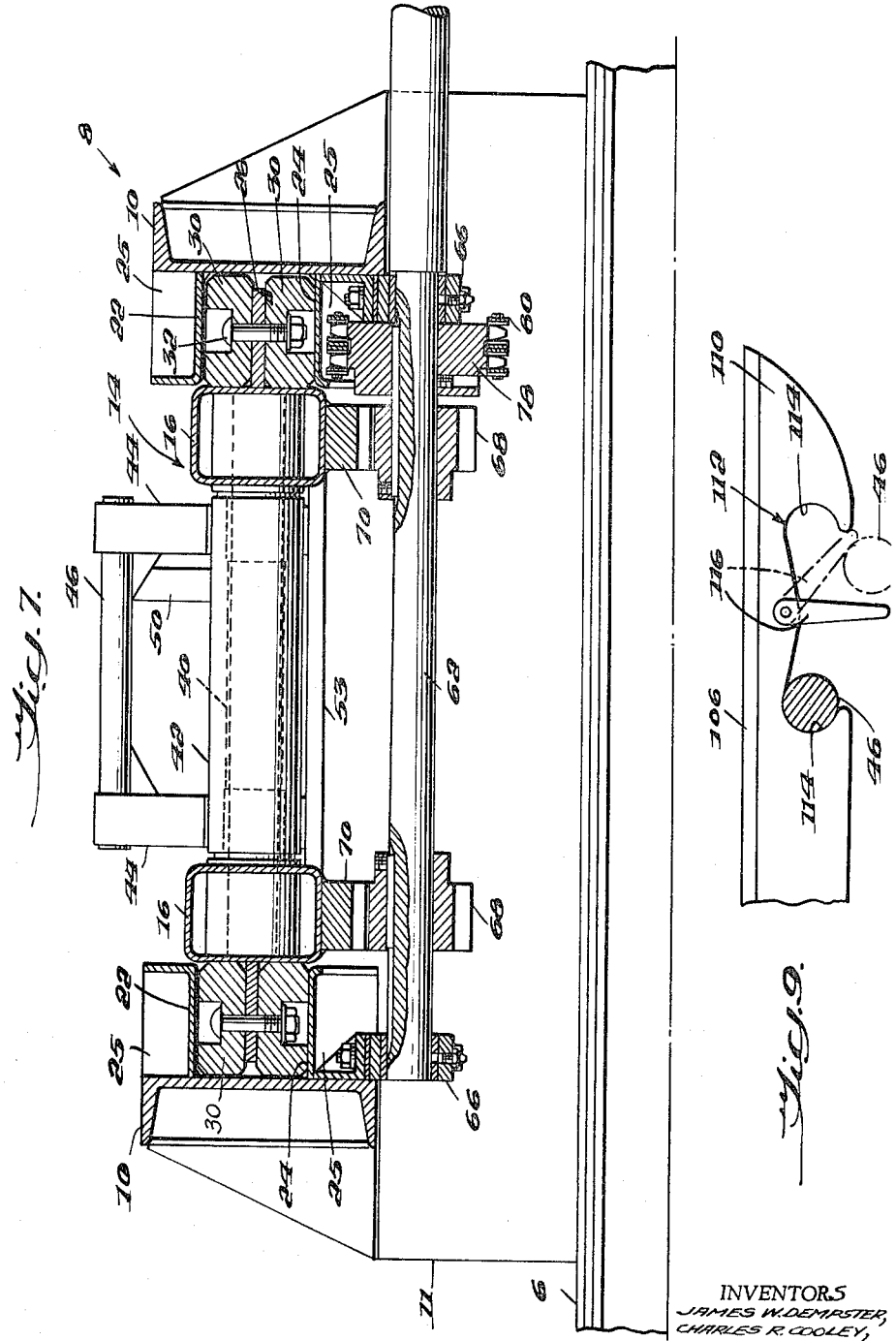

March 30, 1965 J. W. DEMPSTER ET AL 3,175,718
APPARATUS FOR HANDLING CONTAINERS
Filed Feb. 1, 1963 7 Sheets-Sheet 7
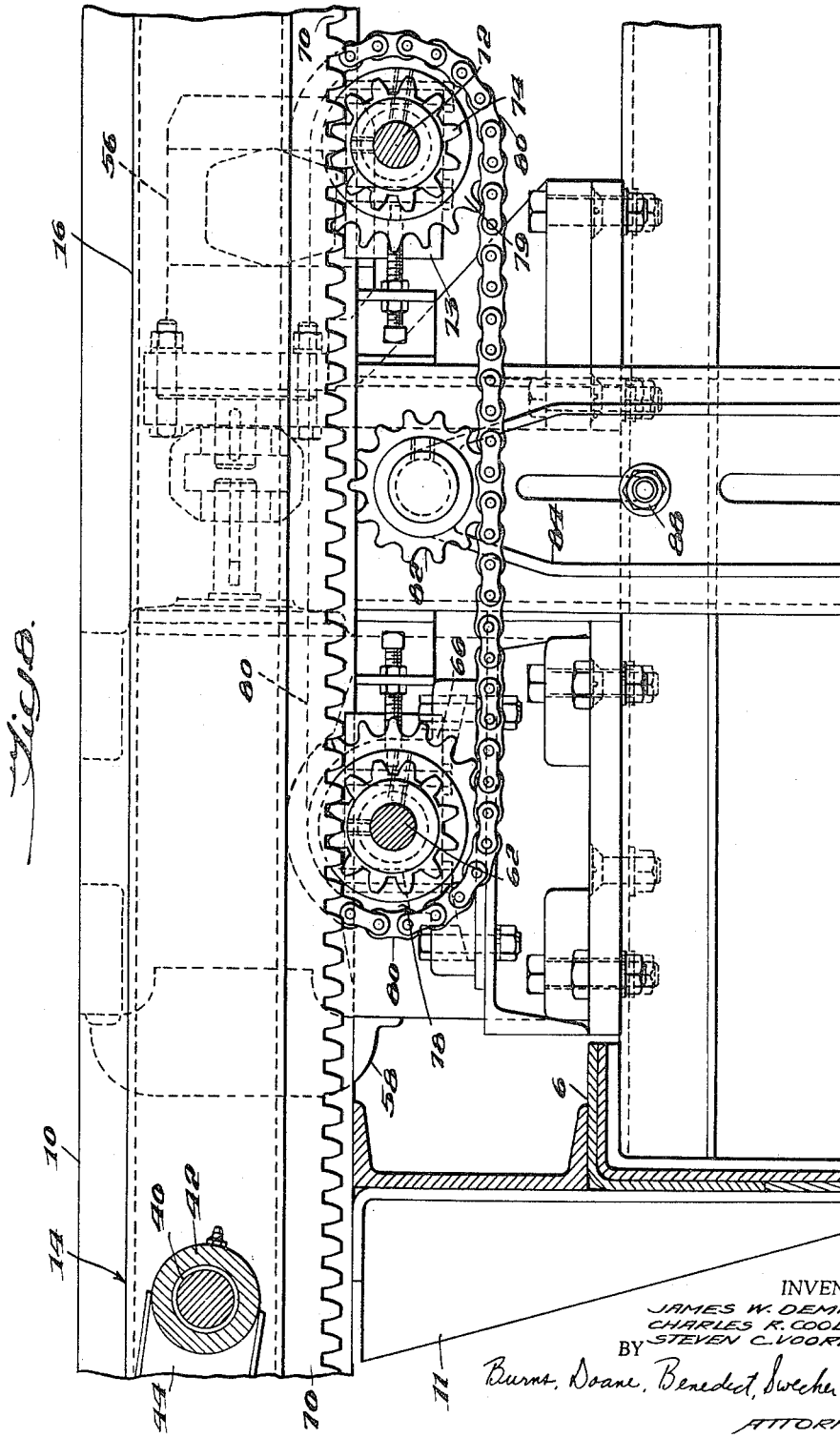
INVENTORS
JAMES W. DEMPSTER,
CHARLES R. COOLEY,
STEVEN C. VOORHEES,
BY Burns, Doane, Benedict, Swecker & Mathis
ATTORNEYS 3,175,718
Patented Mar. 30, 1965

3,175,718
APPARATUS FOR HANDLING CONTAINERS
James W. Dempster, Charles R. Cooley, and Steven C. Voorhees, Knoxville, Tenn., assignors to Dempster Brothers, Inc., Knoxville, Tenn., a corporation of Tennessee
Filed Feb. 1, 1963, Ser. No. 255,481
5 Claims. (Cl. 214—516)

This application discloses and claims subject matter also disclosed in prior application filed May 10, 1962, Serial No. 194,751, now abandoned.

This invention relates to a method and apparatus for handling containers and includes the use of a container transfer vehicle adapted for handling large size containers at a transfer terminal. The transfer vehicle may be used to transfer containers between a railway car and a highway vehicle, for example.

One way of handling cargo of various types is to pack the cargo in large size containers and transfer the containers between points by using both railway cars and highway trucks. Usually, the containers are loaded onto a highway truck at the point of origin and then transported to a railroad terminal. At the terminal, the containers are removed from the highway truck and loaded onto a railway car. At a distant railroad terminal the containers are unloaded from the railway car and then loaded onto a highway truck for transportation to a final destination.

The primary object of this invention is to provide a method and apparatus for handling large size containers wherein a transfer vehicle equipped with suitable mechanism is used for transporting and transferring large size containers between railway cars, highway trucks, raised platforms, and the like.

This object may be accomplished generally by equipping a truck or other suitable vehicle with a transfer mechanism for loading and unloading large size containers with respect to the vehicle. The transfer mechanism is mounted on the vehicle chassis and includes a pair of carriage assemblies mounted on supporting rails for reciprocating movement laterally of the vehicle. A suitable power device is provided for propelling the carriage assemblies under the control of an operator without the need for the operator to leave the cab of the vehicle. A pair of oppositely facing bail assemblies are pivotally mounted on each carriage assembly and spring biased to extend upwardly for engagement with a container which is to be transferred.

Tracks are provided on the vehicle and extend laterally thereof for supporting and for assisting in guiding a container into the proper position on the transfer vehicle. Railway cars, highway trucks and loading docks which are to accommodate such containers also are provided with similar tracks.

Each container to be handled by the transfer vehicle is provided with guides or runners on the bottom thereof for guided engagement with the tracks. Hook bars having a hook station at each end, with a pair of opposed hook surfaces adapted to be engaged by a bail assembly of the transfer mechanism, are fixed on the bottom of each container. The carriage assemblies can be extended beyond either side of the transfer vehicle so that they can engage a container while the container is on a railway car, a loading platform or a highway truck. Leveling jacks may be provided on the transfer vehicle for adjusting the height of the vehicle, and for leveling and stabilizing the vehicle, if necessary.

In using the transfer vehicle to handle large size containers in an efficient and economical manner not heretofore provided by conventional equipment, the following procedure is employed. One transfer vehicle may be used at a railroad terminal in order to service a number of railway cars and a number of highway trucks. Assuming, for example, that a container is on a railway car and that the container is to be moved to a distant warehouse, the transfer vehicle is driven alongside either side of the railway car so that the tracks on the vehicle are aligned with corresponding tracks on the railway car. The carriage assemblies of the transfer mechanism on the transfer vehicle are extended toward the railway car so that the bail assemblies engage hook stations on the container. By proper manipulation of the transfer mechanism, the container can be pulled in step-by-step motion from the railway car across the transfer vehicle and onto a waiting highway truck. Alternatively, after the container is on the transfer vehicle, the vehicle can be driven to another point at the terminal where the container is unloaded from the transfer vehicle onto a highway truck. A reverse procedure is followed for loading containers onto railway cars.

A preferred embodiment of the invention is illustrated in the accompanying drawings in which:

FIG. 1 is a perspective view of a vehicle equipped with the container transferring mechanism of this invention and showing a container of the type adapted to be handled by the transfer vehicle;

FIG. 2 is an elevation view showing a diagrammatic representation of a transfer vehicle of this invention positioned between a railway car and a highway truck and showing various positions of the transfer mechanism during a container loading or unloading operation;

FIG. 3 is a plan view of the rear portion of a transfer vehicle equipped with a container transferring mechanism;

FIG. 4 is a side elevation view corresponding with FIG. 3;

FIG. 5 is an enlarged side elevation view of one-half of a carriage assembly of the container transfer mechanism, and with a part in section;

FIG. 6 is a top plan view corresponding with FIG. 5;

FIG. 7 is an enlarged cross section view taken along line 7—7 in FIG. 3;

FIG. 8 is a cross section view taken along line 8—8 in FIG. 3; and

FIG. 9 is an enlarged elevation view showing a fragment of a hook bar on a container, and with a part in section.

A container transfer vehicle 2 of this invention (illustrated in perspective in FIG. 1) is preferably a heavy duty type truck having a cab 4 and a chassis 6. A container transfer mechanism is mounted on the chassis 6 behind the cab 4 and includes two power assemblies 8 which are substantially identical, and each of which includes a pair of spaced-apart guide and support channels 10 mounted by brackets 11 to extend transversely of the vehicle 2.

A movable carriage assembly 14 (one-half of which is shown in detail in FIGS. 5 and 6) is located between the channels 10 of each power assembly 8. Each carriage assembly 14 is made up of a pair of spaced-apart, elongated side members 16 which extend adjacent the channels 10 and which are approximately the same length as the channels. A cross member 18, as well as other suitable cross members, extends between the middle of the side members 16 to provide a rigid frame structure for the carriage assembly 14.

Each carriage assembly 14 is mounted on corresponding channels 10 for lateral, extended movement with respect to the vehicle 2. The connection between the carriage member 14 and the channels 10 includes an upper rail member 22 and a lower rail member 24 connected to the web of each channel 10 by a series of brackets 25 and spaced apart vertically from one another to form an elongated channel-shaped guide or track extending transversely of the vehicle 2. Each of the side members 16 of the carriage assembly 14 has fixed thereon, as by welding, a plate member 26 (or a group of aligned plate members) which extends into the space between the upper and lower rail members 22 and 24. Sliding blocks 30 are fixed to the upper and lower surfaces of the plate 26 by nut and bolt devices 32. The sliding blocks 30 may be made of phenolic resin or any other suitable material which has good wear qualities and which will allow the blocks to slide freely along the upper and lower rail members 22 and 24.

The rail members 22 and 24 extend substantially throughout the length of the channels 10, and the sliding blocks 30 attached to the side members 16 by the plate members 26, similarly, extend substantially throughout the length of the side members 16. In this manner, the carriage assembly 14 can be extended in either direction transversely of the vehicle beyond the ends of the channels 10 a considerable distance as the rail members 22 and 24 cooperate with the sliding blocks 30 to support and maintain the carriage assembly 14 in proper relationship with the channels 10.

Two oppositely directed cantilever devices 36 and 38 are pivotally mounted on each carriage assembly 14 to extend in opposite directions. Each of said cantilever devices, in the example illustrated, comprises a bail assembly including a shaft 40 supported by and extending between the side members 16. A sleeve 42 surrounds the shaft 40 for rotation with respect thereto and has fixed thereon a pair of parallel bail arms 44 which extend toward the adjacent end of the carriage assembly 14. The outer ends of the bail arms 44, opposite the sleeve 42, are connected by a bar or rod 46.

Each bail assembly 36 and 38 is biased to a normally raised position, illustrated in FIG. 5, by a leaf spring 50. One end of the leaf spring 50 is fastened by U-shaped bolts 52 to a cross member 53 extending between the side members 16 of the carriage assembly 14. The free end of the leaf spring 50 bears against the bottom surface of the free end of the bail assembly to force that end to a raised position. Each bail assembly 36 and 38 can be moved downwardly against the force of the spring 50, but once the downward pressure is relieved, the bail assembly will assume its normally raised position.

The two carriage assemblies 14 are propelled in unison either to one side or the other, transversely of the vehicle 2. The power mechanism for propelling the carriage assemblies 14 may include an hydraulic motor 56 (FIG. 3) connected with a suitable gear reducer 58, which in turn powers a drive shaft 60, extending to the power device 8 immediately behind the cab 4 of the vehicle, and a drive shaft 62, extending to the power assembly 8 adjacent the rear of the vehicle 2. Suitable couplings 63 are provided as needed.

In FIGS. 7 and 8 there is illustrated in detail a drive arrangement whereby the drive shafts 60 and 62 propel the carriage assemblies 14. Only the rear drive arrangement is illustrated since both are substantially identical.

The drive shaft 62 is shown as supported by bearings 66 which may be made adjustable with respect to the chassis 6. The shaft 62 has fixed thereon spaced-apart pinion gears 68 positioned directly beneath the side members 16 of the carriage assembly 14. Fixed on the bottom surface of each of the side members 16, and aligned longitudinally with respect thereto, is a gear rack 70, each of which meshes with a corresponding pinion gear 68.

An idler drive shaft 72, spaced transversely of and parallel with the shaft 62, is mounted on the vehicle chassis 6 by adjustable bearings 73. The idler shaft 72 has mounted thereon a pair of pinion gears 74 which engage corresponding gear racks 70.

The drive shaft 62 has a sprocket 78 mounted thereon and the idler shaft 72 has a similar sprocket 79 mounted thereon in transverse alignment with the sprocket 78.

A drive chain 80 for driving the shaft 72 extends around the sprockets 78 and 79.

An idler sprocket 82 is mounted for rotation on a bracket 84 which is adjustably connected to the power device 8 by a fastening assembly 88. Adjustment of the bracket 84 can be made so that the idler sprocket 82 can vary the tension in the chain 80.

A construction similar to that shown in FIGS. 7 and 8 is employed for driving the forward carriage assembly 14. The two drive shafts 60 and 62 are rotated at the same speed and in unison so that the two carriage assemblies 14 will move in the same lateral direction and the same distance. Use of gear racks and the use of two pairs of pinion gears for driving each gear rack in connection with the use of a chain drive provides a positive drive system for propelling the carriage assemblies and affords precise control over the movement of the carriage assemblies.

Two track sections 90 are mounted on the vehicle chassis 6, one of which is located immediately behind the cab 4 and the other of which is located adjacent the rear of the vehicle. Each track section 90 has spaced-apart, upwardly extending side portions 92 for receiving and guiding a container. The ends of the side portions 92 are flared outwardly for easy entrance of the container onto the tracks 90.

Leveling jack assemblies 96 are mounted on the extending ends of the track sections 90 and each includes a cylinder section 98 and a rod 100 which is extendable and retractable with respect to the cylinder section 98. A foot or pad 102 is provided on the lower end of each rod 100 for bearing engagement with the ground or other surface. The jack assemblies 96 may be operated independently of one another by means of fluid pressure in order to raise the chassis of the vehicle 2 in order to bring it to the same height as a railway car or other platform, or to make the vehicle level for facilitating the transferring of a container. The jack assemblies 96 also serve to support the vehicle 2 against tipping during a container transferring operation.

A typical container 106 which may be accommodated by the transfer vehicle 2 is illustrated in FIG. 1 and shown in various positions during a transferring operation in FIG. 2. Although such a container is illustrated as being of general box-type construction, the configuration of the containers which may be accommodated is not limited to this shape. Also, the transfer vehicle 2 may handle platforms with cargo stacked thereon, tank type containers, machinery or bulky equipment, or the like.

Whatever type of container or equipment is to be handled, it is provided with an understructure which includes transversely extending guides or runners 108 at opposite ends thereof spaced apart a distance corresponding with the spacing of the track sections 90 on the transfer vehicle 2. The runners 108 are of suitable dimension to fit between the upright side sections 92 of the tracks 90 and preferably the ends are curved to facilitate movement of the container onto the track sections 90. Intermediate runners may be provided for supporting the middle of the containers. Also, intermediate track sections, such as the track sections 90, may be provided on the chassis 6 of the vehicle, if necessary.

The understructure also includes hook bars 110 extending transversely of the container or the equipment to be handled and spaced-apart a distance corresponding with the spacing between the power assemblies 8. Each hook bar 110 has a hook station 112 at each end thereof, and each hook station 112 has opposed hook surfaces 114 of suitable size to receive the rods 46 of the bail assemblies 36 and 38. Intermediate hook stations may be employed if needed. The ends of the hook bars 110 are curved so that, upon movement of the rods 46 into engagement with the hook bars, the bail assemblies will be swung downwardly against the force of the springs 50. Each hook station 112 has a shuttle 116 pivotally mounted on the hook bar 110 between the opposed hook surfaces 114. Normally, the shuttle 116 hangs downwardly between the hook surfaces 114 but is able to swing over and to close off either one of the hook surfaces 114 in order to prevent a rod 46 from entering the hook station as the rod slides along the bottom edge of the hook bar. Upon slight reverse movement of the rod 46, the shuttle 116 will be pushed away so that the rod 46 may be forced upwardly by the spring 50 into engagement with a hook surface 114. By proper actuation of the motor 56 to propel the carriage assemblies 14 in either direction, the operator can adjust the position of the rods 46 to cause the rods to enter any one of the hook stations 112 and to engage either hook surface 114.

In the diagrammatic representation in FIG. 2, the transfer vehicle 2 is shown in position adjacent a railway car 120 for transferring a container 106 therebetween. The railway car 120 is provided with track sections or guide devices similar to the track sections 90 mounted on the transfer vehicle 2. In FIG. 2 a highway truck 124 is shown positioned alongside of the transfer vehicle 2. The highway truck 124 also is provided with guide members or track sections similar to the track section 90 spaced apart a distance corresponding with the spacing between the track sections 90.

In order to transfer the container 106 between the transfer vehicle 2 and the railway car 120, for example, the transfer vehicle 2 is driven alongside of the railway car so that the track sections 90 become aligned longitudinally with the corresponding guide sections on the railway car. The bail assemblies 36 normally are in position A when the transfer vehicle 2 is driven overland. The jack assemblies 96 may be actuated separately in order to level the chassis 6 or to bring the track sections 90 into proper horizontal alignment with the corresponding guide members on the railway car. Either the driver's side of the vehicle 2 or the other side may be maneuvered alongside of the railway car. The container 106 can be moved directly from the railway car 120, across the transfer vehicle 2, and onto the truck 124 in a continuous transfer operation; or the container can be loaded onto the transfer vehicle 2 so that the vehicle can take the container to a distant point to a truck 124.

Movement of the container 106 off of the railroad car 120 is accomplished by actuating the motor 56 to extend the carriage assemblies 14 toward the railway car 120 far enough so that the rods 46 of the bail assemblies 36 extend under the hook bars 110 on the container. The bail assemblies can be extended as far as position B, for example. At position C, however, the rods 46 will slide upwardly into engagement with the hook stations 112. Stop blocks 130 (FIGS. 5 and 6) on the cross members 53 engage abutment members 132 on the vehicle chassis for limiting the lateral travel of the carriage assemblies.

The motor 56 is actuated to retract the carriage assemblies 14 toward the vehicle 2 and in turn pull the bail assemblies 36 toward the vehicle 2. Upon continued actuation of the motor 56, the container 106 is pulled off of the railway car 120 and onto the transfer vehicle 2 as the runners 108 slide into the track sections 90 on the vehicle 2. The motor 56 can be actuated to pull the carriage assemblies 14 far enough to the right, as illustrated in FIG. 2, to move the bail assemblies 36 toward and past position D. During one such stroke of the carriage assemblies 14, the container 106 will be pulled from position X to position Y.

The motor 56 is then reversed to propel the carriage assemblies 14 to the left, as illustrated in FIG. 2, in order to bring the rods 46 of the bail assemblies 36 into engagement with the other hook station 112 near the left-hand side of the container 106. The carriage assemblies 14 can be propelled again toward the right to move the container further onto the transfer vehicle 2. The necessary number of long or short strokes of the carriage assemblies 14 may be made in order to move the container 106 in step-by-step motion onto the vehicle 2.

After the container 106 is on the vehicle 2, the vehicle can be driven to a location where a highway truck 124 is located. Normally, such a location would be near the railroad terminal. On the other hand, the container can be moved onto a truck 124 while the three vehicles are positioned as shown in FIG. 2. The container 106 is moved from the transfer vehicle 2 to the truck 124 by reversing the loading operation, and pushing the container onto the truck in step-by-step motion to position Z. The bail assemblies 38 are engaged with one of the hook stations 112 on the container 106 and the motor 56 is actuated to propel the container to the right, as illustrated in FIG. 2, in order to push the container onto the truck 124 as the runners 108 slide into tracks on the truck similar to the tracks 90. The highway truck then can be driven to a distant location, and the transfer vehicle 2 can be used for transferring additional containers from other railway cars to waiting highway trucks. The transfer vehicle 2 is used also to transfer containers from highway trucks into railway cars at a railroad terminal.

It wil be noted from FIG. 1 that the length of the support members 10 for the carriage assemblies, as well as the length of the track sections 90, is approximately the same as the overall width of the vehicle on which these parts are mounted. Most States have regulations limiting the overall width of highway vehicles which thereby restrict the length of the carriage assemblies 14 to substantially the same length as these parts just described or to the width of the vehicle.

In the operation of the equipment as described above, it is desirable that the carriage assemblies should travel sufficiently far so that the cantilevers provided by the bail assemblies 36 and 38 in this embodiment of the invention not only may bridge the distance between the vehicle and the railroad car in their side-by-side positions, but also reach under the container or body sufficiently to engage automatically with the hook station provided on the body for moving the container or body upon reverse action of the carriage assembly. If the driving connection with the rack bar 70 were disposed in the upright longitudinal central plane of the vehicle chassis, as viewed in FIG. 2 for example, the travel of the carriage assembly would be materially restricted and may be insufficient to bridge the distance required for the automatic engagement with and movement of the container or body.

For example, as viewed in FIG. 2, if the carriage assembly 14 should travel from the full line position of the cantilever devices provided by the bail assemblies 36 and 38 to the position indicated at B at the left in FIG. 2, the rack 70 would have moved out of engagement with a driving gear located in the aforesaid upright longitudinal central plane. Nevertheless, by disposing the driving gear 68 off-center or spaced an appreciable distance away from the upright longitudinal central plane, the driving connection can be maintained while still permitting of movement of the carriage assembly 14 sufficiently to dispose the bail 36 at the point indicated at B in FIG. 2. In like manner, the second driving gear 74 on the shaft 72 maintains the driving connection with the rack bar 70 during corresponding movement of the carriage assembly 14 to the right in FIG. 2.

Thus the carriage assembly can travel either to the right or to the left a considerable distance, so as to engage automatically with the container or body, either to pull or push the latter without increasing the overall width of the assembly beyond what might be permitted by the legal limits of a highway vehicle.

As illustrated in FIG. 2, the top 121 of the bed or floor of the railway car 120 and the top 125 of the bed of the truck 124 are below the path of the carriage assemblies 14 so that the bail assemblies 36 and 38 may be extended a considerable distance over the railway car 120 and the truck 124 without interference. The runners 108 support the container 106 high enough so that the hook bar 110 is spaced above the tops 121 and 125 a distance great enough for the bail assemblies 36 and 38 to pass between the top 121 or 125 and the bottom of the hook bar 110. This allows the transfer vehicle 2 to be located relatively close to the railway car 120 and the truck 124. The bail assemblies 36 and 38 are engaged and disengaged automatically by proper actuation of the motor 56 under control of the operator while he is seated in the cab 4.

A highly efficient and economical method or system for handling containers can be effected by using at least one transfer vehicle at a railroad yard to transfer containers between highway trucks and railway cars, and by using at least one other transfer vehicle at such locations as warehouses, freight terminals, factories, or the like, to transfer containers between highway trucks and loading platforms.

At a railroad yard, there may be a truck terminal a short distance from the railroad tracks. The transfer vehicle can transfer containers speedily and efficiently between highway trucks at the truck terminal and the railway cars. At a warehouse or a factory, for example, the transfer vehicle can be used to move containers from one building to another as necessary.

The use of a container transfer vehicle is considerably more economical than conventional systems which may use a number of different mechanisms for handling containers. The transfer vehicle is highly mobile and can transfer containers between numerous points under a variety of circumstances. The need for expensive and cumbersome gantry type devices is eliminated.

Although only one container is illustrated and described in connection with the transfer vehicle 2, and the two carriage assemblies have been described as being movable in unison, the carriage assemblies can be made to operate independently of each other, as well as in unison, by the addition of a suitable clutch in the drive shafts 60 and 62. This would allow the transfer vehicle to handle two smaller size containers with the addition of the necessary guide members.

The step-by-step motion of the transfer mechanism in moving the containers affords positive control and movement over the containers during a transfer operation and allows the containers to be pushed or pulled in either direction laterally of the vehicle 2. Extremely heavy and large size containers can be handled safely and economically.

While the invention has been illustrated and described in a certain embodiment, variations and changes may be made without departing from the invention as set forth in the claims.

We claim:

1. The combination with a vehicle having an elongated chassis frame, of transverse support means mounted on the chassis frame, a transferrable container having means for mounting the container on the support means for movement transversely of the vehicle, said container having a plurality of shoulder means adjacent the bottom thereof and spaced apart transversely of the container, a device carried by the vehicle frame and operable transversely thereof, said device including cantilever hook means projecting in one direction relative to the vehicle substantially in alignment with the shoulder means on the container, means for moving said hook means into hook engagement with one of the shoulder means and then back to move the container one step and then into hook engagement with a second of said shoulder means to move the container a second step, and said device including cantilever hook means projecting in the opposite direction relative to the vehicle, and means for moving the last-mentioned cantilever hook means into engagement with a plural number of the shoulder means on the container to push the container off said opposite side of the vehicle.

2. The combination of a vehicle having a chassis including an elongated chassis frame, a pair of tracks extending parallel with each other transversely of the frame, said tracks being spaced apart longitudinally of the frame, a transferrable container having runners adjacent opposite ends thereof in position for guided relation with the respective tracks, said container having a plurality of shoulder means underneath the bottom thereof and spaced apart transversely of the container, a device mounted on the elongated frame and operable transversely thereof, said device including cantilever hook means projecting from one side of the vehicle underneath the container, means for moving said hook means into hook engagement with one of the shoulder means and then back to move the container one step and then into hook engagement with a second of said shoulder means to move the container a second step, and said device including cantilever hook means projecting from the opposite side of the vehicle underneath the container and means for moving the last-mentioned cantilever hook means into engagement a plural number of times with a plurality of the shoulder means on the container to push the container off said opposite side of the vehicle.

3. The combination with a vehicle having a supporting frame, of transverse support means mounted on the frame, a transferrable container having means for mounting the container on the support means for movement transversely of the vehicle, said container having a plurality of shoulder means adjacent the bottom thereof and spaced apart transversely of the container, oppositely directed cantilever means, means mouting the cantilever means on the vehicle for movement transversely thereof, and power means for moving one of the cantilever means forward a plural number of times into connected relation with a plurality of different shoulder means and then back in successive pulling actions to move the container stepwise and thereafter to move the other cantilever means a plural number of times into connected relation successively with a plurality of different shoulder means spaced transversely of the container in pushing relation with the container.

4. The combination of a vehicle having a supporting frame, track devices extending parallel with each other and transversely of the frame, said track devices being spaced apart longitudinally of the frame, a transferrable container having support means on the bottom portion thereof mounted on the respective track devices and supporting the container thereon, a plurality of shoulder means in the bottom portion of the container spaced transversely thereof, oppositely directed cantilever means, means mounting the cantilever means on the vehicle for movement approximately parallel with the track devices, and power means for moving one of the cantilever means forward a plural number of times into connected relation with a plurality of different shoulder means and then back in successive pulling actions to move the container stepwise and thereafter to move the other cantilever means a plural number of times into connected relation successively with a plurality of different shoulder means spaced transversely of the container in pushing relation with the container.

5. The combination of a vehicle having a supporting frame, track devices extending parallel with each other and transversely of the frame, said track devices being spaced apart longitudinally of the frame, a transferrable container having support means thereon mounted on the respective track devices and supporting the container thereon, a plurality of shoulder means on the container, spaced transversely thereof, oppositely directed cantilever means, means mounting the cantilever means on the vehicle for bodily movement thereof approximately parallel with the track devices, and power means for moving one of the cantilever means forward a plural number of times into connected relation with a plurality of different shoulder means and then back in successive pulling actions to move the container stepwise and thereafter to move the other cantilever means a plural number of times into connected relation successively with a plurality of different shoulder means spaced transversely of the container in pushing relation with the container, said power means including a longitudinally movable member extending transversely of the vehicle and connected with the cantilever means, a shaft having operative driving connection with said longitudinally movable member, a second shaft having operative driving connection with said longitudinally movable member, means operatively connecting the shafts together, and power means for driving the respective shafts.

References Cited by the Examiner

UNITED STATES PATENTS

| | | |
|---|---|---|
| 1,869,046 | 7/32 | Buck. |
| 1,877,193 | 9/32 | Norton. |
| 1,910,398 | 5/33 | Ludington _____ 214—516 |
| 2,304,116 | 12/42 | Fitch et al. _____ 214—516 |
| 2,348,019 | 5/44 | Norbom _____ 214—516 |
| 2,521,727 | 9/50 | Kappen _____ 214—16.4 X |
| 2,591,153 | 4/52 | Hodges _____ 214—516 |
| 2,633,809 | 4/53 | Robinson et al. |
| 2,728,471 | 12/55 | Jones _____ 214—58 |
| 2,831,588 | 4/58 | Seed _____ 214—38.40 |
| 2,926,797 | 3/60 | Decker _____ 214—38.40 |
| 3,107,020 | 10/63 | Dempster et al. _____ 214—516 X |

HUGO O. SCHULZ, *Primary Examiner.*

GERALD M. FORLENZA, *Examiner.*